UNITED STATES PATENT OFFICE 2,547,724

2-ALKYLIMINONAPHTHO [2,3]-1,3-DITHOLE-4,9-DIONE ALKOHALIDE AND FUNGICIDAL COMPOSITIONS CONTAINING SAME

Norman K. Sundholm, Naugatuck, Conn., assignor to United States Rubber Company, New York, N. Y., a corporation of New Jersey No Drawing. Application December 8, 1949, Serial No. 131,920

8 Claims. (Cl. 167—33)

This invention relates to new chemicals which are useful as fungicides.

The chemicals of the present invention are 2 - alkyliminonaphtho[2,3] - 1,3 - dithiole - 4,9 - dione alkohalides.

These compounds are named according to the scheme for ring system numbers 1615 in "The Ring Index," American Chemical Society Monograph No. 84 by Patterson and Capell. The structural formula for the 2-alkyliminonaphtho[2,3]-1,3-dithiole-4,9-dione alkohalides is

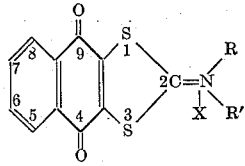

where R and R' are alkyl radicals, e. g. methyl, ethyl, n-propyl, n-butyl, n-amyl, n-hexyl, iso-amyl, isobutyl, sec-butyl, n-octyl, n-decyl, n-dodecyl radicals, and X is a halide ion, e. g. a chloride or bromide ion.

The 2 - alkyliminonaphtho[2,3] - 1,3 - dithiole - 4,9-dione alkohalides are prepared by reacting a 2,3-dihalo-1,4-naphthoquinone with a salt of a dialkyl dithiocarbamic acid. Such dithiocarbamates with various alkyl substituents are commercially well-known dithiocarbamates and the alkyl substituents in the amino group of the dithiocarbamate may be selected to give the desired substituents on the nitrogen of the 2-alkyliminonaphtho[2,3] - 1,3 - dithiole - 4,9 - dione alkohalide.

The 2 - alkyliminonaphtho[2,3] - 1,3 - dithiole - 4,9-dione alkochlorides of the present invention are prepared according to the following equation:

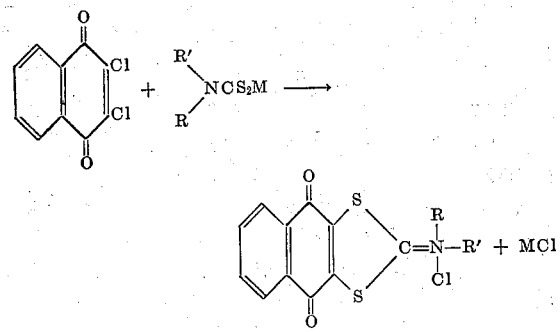

In the above reaction, M represents a member of the alkali group, such as sodium, potassium, ammonium or substituted ammonium (amine), which give the common water-soluble alkali dithiocarbamates. The R and R' represent alkyl radicals, which may be the same or different, e. g. methyl, ethyl, n-propyl, n-butyl, n-amyl, n-hexyl, isoamyl, isobutyl, sec-butyl, n-octyl, n-decyl, n-dodecyl radicals. As these various dialkyl substituted dithiocarbamates are common commercial chemicals, it is an easy matter to select the substituents in the amino group of the dithiocarbamate to give the desired alkyl substituents on the nitrogen in the chemical of the invention as prepared according to the above reaction. With 2,3-dibromo-1,4-naphthoquinone as a starting material instead of the 2,3-dichloro-1,4-naphthoquinone as in the above reaction, there is naturally obtained a 2-alkyliminonaphtho[2,3] - 1,3 - dithiole - 4,9 - dione alko-bromide. The above reaction can be carried out by mixing the reactants at room temperature in a liquid medium, for example, a mixture of water and a water-soluble organic solvent and then heating the mixture to a temperature in the range of 70–80° C.

The 2 - alkyliminonaphtho[2,3] - 1,3 - dithiole - 4,9-dione alkohalides prepared as above may be readily hydrolyzed with dilute mineral acid to naphtho[2,3] - 1,3 - dithiole - 2,4,9 - trione as shown in the following hydrolysis reaction:

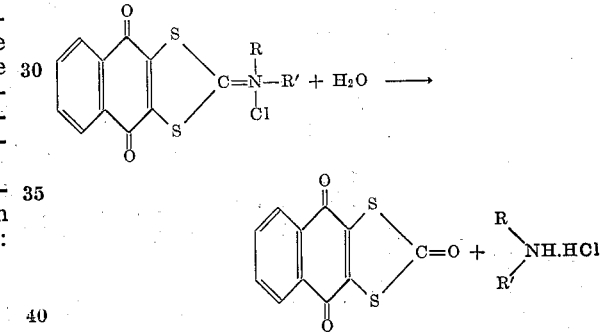

The chemicals of the present invention are effective fungicides. They may be applied to plants (the term "plants" including plant parts, e. g. seeds) directly, or in an inert medium as a dust in admixture with a powdered solid carrier, such as the various mineral silicates, e. g. mica, talc, pyrophyllite and clays, or as an aqueous spray in suspension in water. They may be applied in admixture with small amounts of a surface-active agent which may be an anionic surface-active agent, a non-ionic surface-active agent, or a cationic surface-active agent, and which acts as a wetting agent for the chemical. They may be applied as in foliage treatment in an aqueous suspension containing such a surface-active agent as a dispersing agent. The chemicals of the invention may also be admixed with powdered solid carriers, such as mineral silicates, together with a small amount of such a surface-active agent so that a wettable powder may be obtained which may be applied directly to plants, or which may be shaken up with water to readily prepare a suspension of the chemical (and powdered carrier) in water for application to plants in that form. In fungicidal compositions such as described above, the concentration of the surface-active agent may be from 0.05 to 5% by weight based on the chemicals of the present invention.

The anionic surface-active agents that may be used in the present fungicidal compositions are those having a general formula selected from the group consisting of R—COOM, R—SO₃M, and R—OSO₃M, where M represents alkali-metal, ammonium or substituted ammonium (amine) radical, and R represents an organic radical containing at least one group having more than 8 carbon atoms. Examples of such anionic surface-active agents are:

(1) Soaps (e. g. sodium laurate, ammonium stearate, diethanolammonium oleate).

(2) Alkyl sulfonates (e. g. dodecyl sodium sulfonate, cetyl potassium sulfonate).

(3) Alkyl sulfates (e. g. sodium dodecyl sulfate, sodium oleyl sulfate).

(4) Sulfonated ethers of long and short chain aliphatic groups (e. g.

$$C_{17}H_{33}—O—C_2H_4—SO_3—Na)$$

(5) Sulfated ethers of long and short chain aliphatic groups (e. g.

$$C_{17}H_{33}—O—C_2H_4—O—SO_3Na)$$

(6) Sulfonated alkyl esters of long chain fatty acids (e. g.

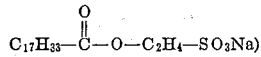

(7) Sulfonated glycol esters of long chain fatty acids (e. g.

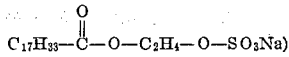

(8) Sulfonated alkyl substituted amides of long chain fatty acids (e. g.

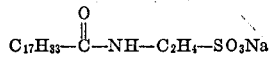

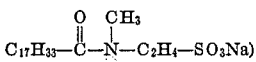

(9) Alkylated aryl sulfonates (e. g. isopropyl naphthalene sodium sulfonate, dodecyl benzene sodium sulfonate).

(10) Hydroaromatic sulfonates (e. g. tetrahydro-naphthalene sodium sulfonate).

(11) Alkyl sulfosuccinates (e. g. dioctyl sodium sulfosuccinate).

(12) Aryl sulfonate-formaldehyde condensation products (e. g. condensation product of formaldehyde and sodium naphthalene sulfonate,

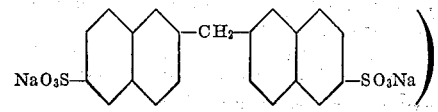

Non-ionic surface-active agents that may be used in the present fungicidal compositions are:

(1) Monoethers of polyglycols with long-chain fatty alcohols, such as reaction products of ethylene oxide or polyethylene glycol with a long-chain fatty alcohol (e. g. reaction product of ethylene oxide and oleyl alcohol, viz:

$$C_{18}H_{35}—(OC_2H_4)_nOH$$

where n is 10 to 20).

(2) Monoesters of polyglycols with long chain fatty acids, such as reaction products of ethylene oxide or polyethylene glycol with a long chain fatty acid (e. g. reaction product of ethylene oxide or polyethylene glycol with oleic acid, viz:

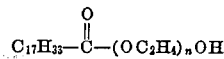

where n is 10 to 20).

(3) Monoethers of polyglycols with alkylated phenols, such as reaction products of ethylene oxide or polyethylene glycol with an alkyl phenol (e. g. reaction product of ethylene oxide and isopropyl phenol, viz:

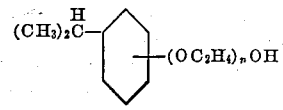

where n is 10 to 20).

(4) Partial esters of polyhydric alcohols with long chain monocarboxylic (fatty and/or resin) acids (e. g. glycerol monostearate, sorbitan trioleate).

(5) Partial and complete esters of long chain monocarboxylic (fatty and/or resin) acids with polyglycol ethers of polyhydric alcohols (e. g. tristearic acid ester of polyglycol ether of sorbitan, or so-called polyoxyethylene sorbitan tristearate; hexaoleic acid ester of polyglycol ether of sorbitol, or so-called polyoxyethylene sorbitol hexaoleate).

Cationic surface-active agents that may be used in the present fungicidal compositions are:

(1) Quaternary ammonium salts in which one of the groups attached to the nitrogen is an aliphatic group having at least 8 carbon atoms (e. g. trimethyl cetyl ammonium iodide, lauryl pyridinium chloride, cetyl dimethyl benzyl ammonium chloride, N-stearyl betaine).

(2) Amines, amides, diamines and glyoxalidines having an aliphatic group containing at least 8 carbon atoms, and their acid esters (e. g. stearylamine hydrochloride, oleyl amide, diethylethylene oleyl diamine, 2-heptadecyl N-hydroxyethyl glyoxalidine).

The following is illustrative of the preparation of the chemicals of the invention:

*Preparation of 2-methyliminonaphtho[2,3]-1,3-dithiole-4,9-dione methochloride*

To a stirred mixture of 142 grams (0.82 mole) of 26% dimethylamine and 400 ml. of ethanol at 15° C. was added 32 grams (0.42 mole) of carbon disulfide in one portion. The temperature of the mixture rose to 35° C. After cooling to about 25° C., the mixture was stirred for one hour. This solution of dimethylammonium dimethyldithiocarbamate was added slowly to a well-agitated suspension of 90.8 grams (0.40 mole) of finely-ground 2,3-dichloro-1,4-naphthoquinone in 300 ml. of ethanol. During the addition, which took twenty-five minutes, the temperature of the reaction mixture rose from 24° C. to 50° C. During the last stages of the addition, the dark brown reaction mixture became thick. It was heated and allowed to reflux for twenty minutes, after which the brown crystalline product was collected by filtration and washed with 150 ml. of hot ethanol. This material was purified by dissolving it in 0.5 N hydrochloric acid at 85° C. at the rate of 1 gram per 100 ml., filtering the solution hot, and allowing the filtrate to cool in an ice-bath. The golden yellow plates which crystallized were collected by filtration and dried at 70° C.; yield, 86 grams (65% of theory). The compound crystallized as the monohydrate. The monohydrate melts with decomposition at a point which varies with the rate of heating. When the capillary is immersed in the bath at 220° C. and the temperature of the bath raised 3-4° C. per minute, the compound melts with decomposition at 226–228° C. Under the influence of light the compound discolors quite rapidly, turning to green-brown. The analytical sample was dried at 80° C. under a pressure of about 50 mm.; this treatment did not change the melting point. The melting point and analysis of another sample dried for nineteen hours at 110° C. under 27 mm. pressure showed no change.

Analysis.—Calculated for $C_{13}H_{10}ClNO_2S_2 \cdot H_2O$: Cl, 10.77; N, 4.25. Found: Cl, 11.06; N, 4.31.

The effectiveness of the chemicals of the invention as fungicides is illustrated in the following:

The 2-methyliminonaphtho[2,3]-1,3-dithiole-4,9-dione methochloride monohydrate prepared above was gound with 1% of a sodium alkyl aryl sulfonate, a surface-active agent known to be non-toxic to the pathogen used in the test. It was then suspended with agitation in distilled water at a concentration of 2000 parts per million. Duplicate 6-inch tomato plants of the variety Bonny Best were sprayed for 20 seconds at 20 pounds air pressure with the suspension. After the spray deposit was thoroughly dry (20 hours), the plants and four comparable unprotected (check) plants were sprayed with an aqueous suspension of spores of the early blight fungus, *Alternaria solani*. The plants were held for 20 hours at 75° F. and 99% relative humidity to permit spore germination and infection before removing them to a greenhouse. Records were taken five days later on the number of lesions produced on the 15 major leaflets of the three youngest fully expanded leaves. The data were converted to percentage of control on the basis of the average number of lesions on the four check plants. The compound gave 95% control.

Having thus described my invention, what I claim and desire to protect by Letters Patent is:

1. 2-alkyliminonaphtho[2,3]-1,3-dithiole-4,9-dione alkohalide.
2. 2-alkyliminonaphtho[2,3]-1,3-dithiole-4,9-dione alkochloride.
3. 2-methyliminonaphtho[2,3]-1,3-dithiole-4,9-dione methochloride monohydrate.
4. The method of preparing a 2-alkyliminonaphtho[2,3]-1,3-dithiole-4,9-dione alkohalide which comprises reacting 2,3-dihalo-1,4-naphthoquinone with a salt of a dialkyldithiocarbamic acid.
5. The method of preparing a 2-alkyliminonaphtho[2,3]-1,3-dithiole-4,9-dione alkochloride which comprises reacting 2,3-dichloro-1,4-naphthoquinone with a salt of a dialkyldithiocarbamic acid.
6. A fungicidal composition comprising 2-methyliminonaphtho[2,3]-1,3-dithiole-4,9-dione methochloride monohydrate, and a surface-active dispersing agent.
7. A fungicidal composition comprising 2-methyliminonaphtho[2,3]-1,3-dithiole-4,9-dione methochloride monohydrate, and a powdered solid carrier.
8. A fungicidal composition comprising an aqueous suspension of 2-methyliminonaphtho[2,3]-1,3-dithiole-4,9-dione methochloride monohydrate, and a surface-active agent.

NORMAN K. SUNDHOLM.

No references cited.